United States Patent
Modalavalasa et al.

(10) Patent No.: US 10,708,281 B1
(45) Date of Patent: Jul. 7, 2020

(54) CONTENT DELIVERY NETWORK (CDN) BOT DETECTION USING PRIMITIVE AND COMPOUND FEATURE SETS

(71) Applicant: Akamai Technologies, Inc., Cambridge, MA (US)

(72) Inventors: Venkata Sai Kishore Modalavalasa, Santa Clara, CA (US); Sreenath Kurupati, Sunnyvale, CA (US); Tu Vuong, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 179 days.

(21) Appl. No.: 16/140,008

(22) Filed: Sep. 24, 2018

Related U.S. Application Data

(60) Provisional application No. 62/657,970, filed on Apr. 16, 2018.

(51) Int. Cl.
*H04L 29/06* (2006.01)
*H04L 29/12* (2006.01)
*H04N 21/239* (2011.01)
*H04N 21/24* (2011.01)

(52) U.S. Cl.
CPC ........ *H04L 63/1408* (2013.01); *H04L 61/302* (2013.01); *H04N 21/2396* (2013.01); *H04N 21/2408* (2013.01)

(58) Field of Classification Search
CPC .................................................. H04L 63/1408
USPC .................................................................. 726/22
See application file for complete search history.

(56) References Cited

U.S. PATENT DOCUMENTS

| | | | |
|---|---|---|---|
| 9,124,626 B2 * | 9/2015 | Chapman, II | H04L 63/1441 |
| 9,639,699 B1 * | 5/2017 | Kurupati | H04W 12/06 |
| 9,686,300 B1 | 6/2017 | Kurupati | |
| 9,906,544 B1 * | 2/2018 | Kurupati | H04L 63/1425 |
| 10,122,738 B2 * | 11/2018 | Sun | H04L 63/101 |
| 2018/0109559 A1 | 4/2018 | Kurupati | |

* cited by examiner

*Primary Examiner* — Peter C Shaw
(74) *Attorney, Agent, or Firm* — David H. Judson

(57) ABSTRACT

A method of detecting bots, preferably in an operating environment supported by a content delivery network (CDN) that comprises a shared infrastructure of distributed edge servers from which CDN customer content is delivered to requesting end users (clients). The method begins as clients interact with the edge servers. As such interactions occur, transaction data is collected. The transaction data is mined against a set of "primitive" or "compound" features sets to generate a database of information. In particular, preferably the database comprises one or more data structures, wherein a given data structure associates a feature value with its relative percentage occurrence across the collected transaction data. Thereafter, and upon receipt of a new transaction request, primitive or compound feature set data derived from the new transaction request are compared against the database. Based on the comparison, an end user client associated with the new transaction request is then characterized, e.g., as being associated with a human user, or a bot.

19 Claims, 4 Drawing Sheets

| 375-667-375-667 | 23.577492 |
| 414-736-414-736 | 12.114998 |
| 360-640-360-640 | 9.258558 |
| 320-568-320-568 | 7.125424 |
| 1366-728-1366-768 | 6.427249 |
| 1920-1040-1920-1080 | 5.999952 |
| [... truncated (1000s of rows)] | |

| | |
|---|---|
| 878030371 | 43.397674 |
| -999120978 | 8.486658 |
| -396189731 | 5.739853 |
| 824264869 | 5.194600 |
| -799479183 | 3.060234 |
| -1168806869 | 2.808238 |
| 1067895196 | 2.391202 |
| -464219975 | 2.156174 |
| 1762613976 | 2.055205 |
| 1686041625 | 1.818263 |
| -940145739 | 1.793087 |
| -1917250000 | 1.247011 |
| 1914271191 | 1.186835 |
| -2091287032 | 1.136202 |
| [... truncated (1000s of rows)] | |

FIG. 6

| | |
|---|---|
| Mozilla/5.0 (iPhone; CPU iPhone OS 10_3_3 like Mac OS X) AppleWebKit/603.3.8 (KHTML | 29.441499 |
| Mozilla/5.0 (Windows NT 10.0; Win64; x64) AppleWebKit/537.36 (KHTML, like Gecko) Chrome/60.0.3112.113 Safari/537.36 | 7.747794 |
| Mozilla/5.0 (Linux; Android 7.0; | 6.910692 |
| Mozilla/5.0 (iPhone; CPU iPhone OS 10_3_2 like Mac OS X) AppleWebKit/603.2.4 (KHTML | 4.816174 |
| Mozilla/5.0 (Windows NT 10.0; Win64; x64) AppleWebKit/537.36 (KHTML, like Gecko) Chrome/60.0.3112.101 Safari/537.36 | 3.272717 |
| [... truncated (1000s of rows)] | |

FIG. 7

| | |
|---|---|
| 878030371, 375-667-375-667 | 24.381354 |
| 878030371, 414-736-414-736 | 12.574361 |
| 878030371, 320-568-320-568 | 4.897797 |
| 824264869, 360-640-360-640 | 3.843685 |
| -999120978, 1366-728-1366-768 | 2.554043 |
| -999120978, 1920-1040-1920-1080 | 2.372250 |
| 1067895196, 360-640-360-640 | 2.343820 |
| -799479183, 320-568-320-568 | 1.735084 |
| -396189731, 1920-1040-1920-1080 | 1.577981 |
| [... truncated (1000s of rows)] | |

FIG. 8

CONTENT DELIVERY NETWORK (CDN) BOT DETECTION USING PRIMITIVE AND COMPOUND FEATURE SETS

BACKGROUND

Technical Field

This application relates generally to protecting websites and mobile applications (apps) from automated attacks by scripts or bots.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

It is known to provide a JavaScript-based technology to fingerprint clients and collect telemetry to evaluate end user behavior and to differentiate bots from humans. A commercial service of this type was developed by Cyberfend, now owned by Akamai Technologies, Inc. of Cambridge, Mass. Among other uses, this technology is useful to protect transactional workflows including, without limitation, login, checkout, search, gift card validation, coupons/rebates processing, etc., and that are regularly the target of fraud activity using botnets.

Known bot detection schemes include client device fingerprinting. When a fingerprint is found to be generated by a large number of malicious devices (running an attack script), a service provider can assume that those devices are bots and can then take appropriate mitigation actions. While such bot detection and mitigation techniques work well for their intended purpose, a provider of a bot may be able to adapt once it determines that device fingerprinting is being used against the attack. To this end, the provider might then modify the attack script. Thus, for example, every time the script is launched, it randomly changes some of the device fingerprint parameters, for instance, randomizing user agent, device sizes, fonts, canvas fingerprint, etc. A bot detection system running on or in association with the website must itself then adapt if it is going to be successful in identifying the botnet (as in such circumstance the requests appear to be coming from multiple/distinct client computers).

The technique herein addresses this need.

BRIEF SUMMARY

An aspect of this disclosure provides for bot detection, preferably in an operating environment supported by a content delivery network (CDN) that comprises a shared infrastructure of distributed edge servers from which CDN customer content is delivered to requesting end users (clients). A bot detection method begins as clients interact with the edge servers in the usual manner. As such interactions occur, transaction data is collected. The transaction data is mined against a set of "primitive" or "compound" features sets to generate a database of information. In particular, preferably the database comprises one or more data structures, wherein a given data structure associates a feature value with its relative percentage occurrence across the collected transaction data. Thereafter, and upon receipt of a new transaction request, primitive or compound feature set data derived from the new transaction request are compared against the database. Based on the comparison, an end user client associated with the new transaction request is then characterized, e.g., as being associated with a human user, or a bot.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 6 represents a sample table for the primitive feature canvas fingerprint;

FIG. 7 represents a sample table for the feature user agent; and

FIG. 8 represents a sample table for a compound feature (canvas fingerprint | device size).

DETAILED DESCRIPTION

Figure 1:
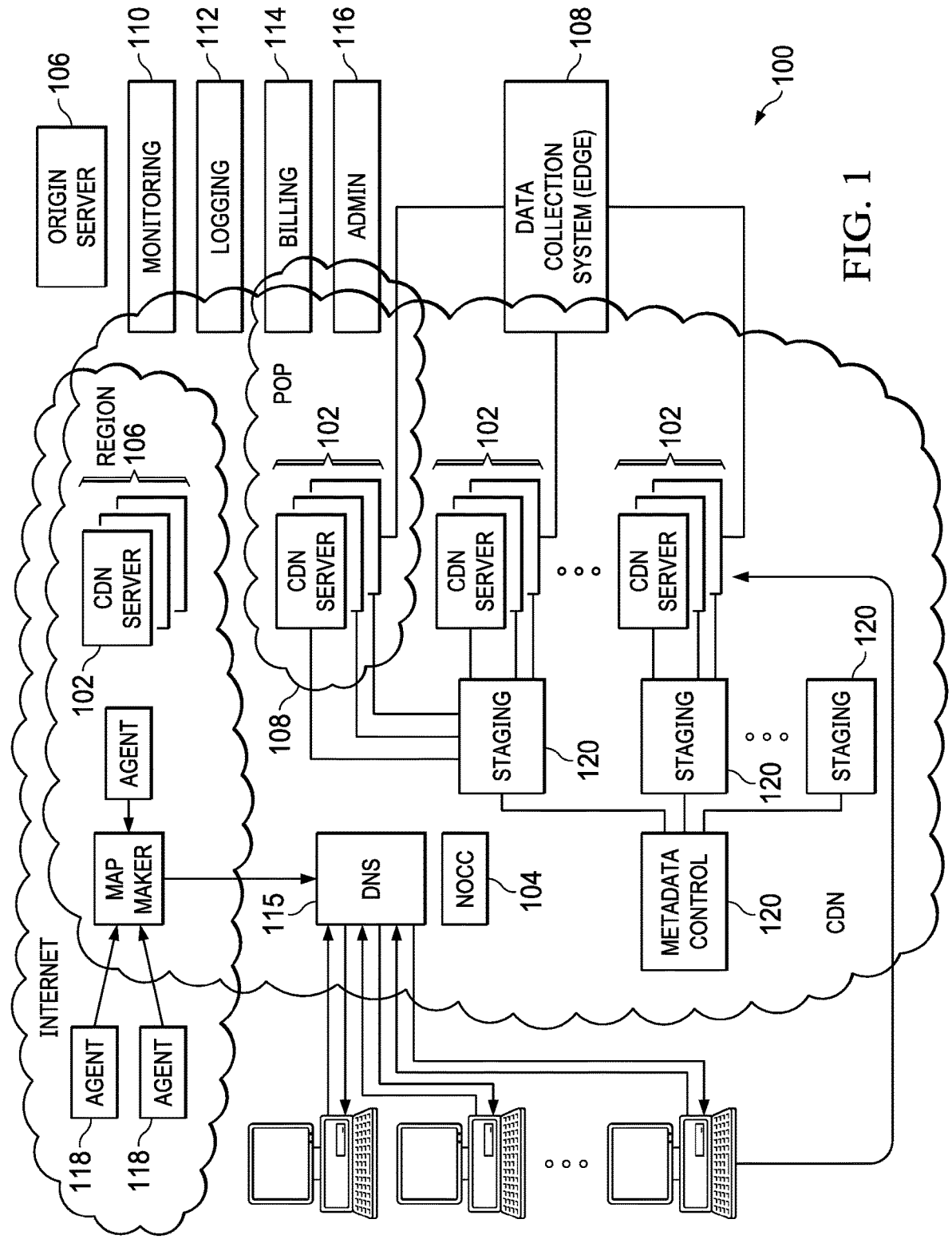
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
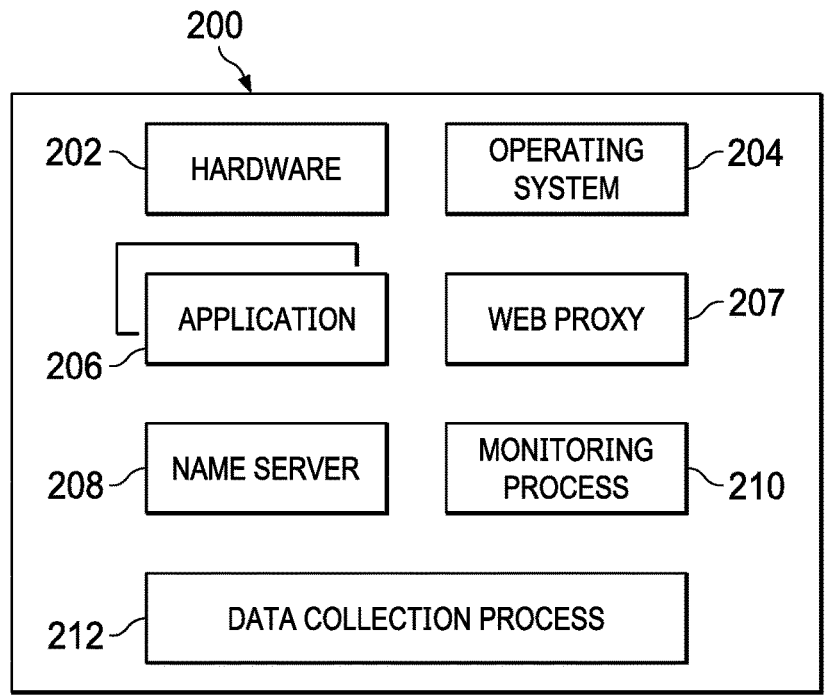
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
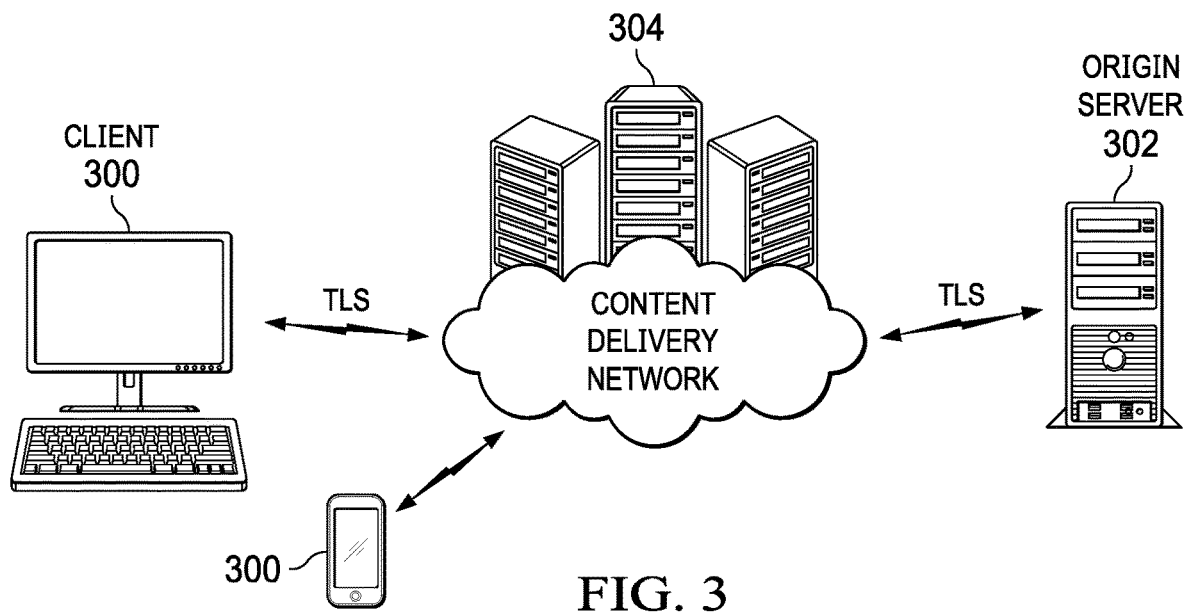
FIG. 3 depicts a representative client machine interaction with an origin server via a content delivery network.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, which sometimes execute on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Figures 4, 5:
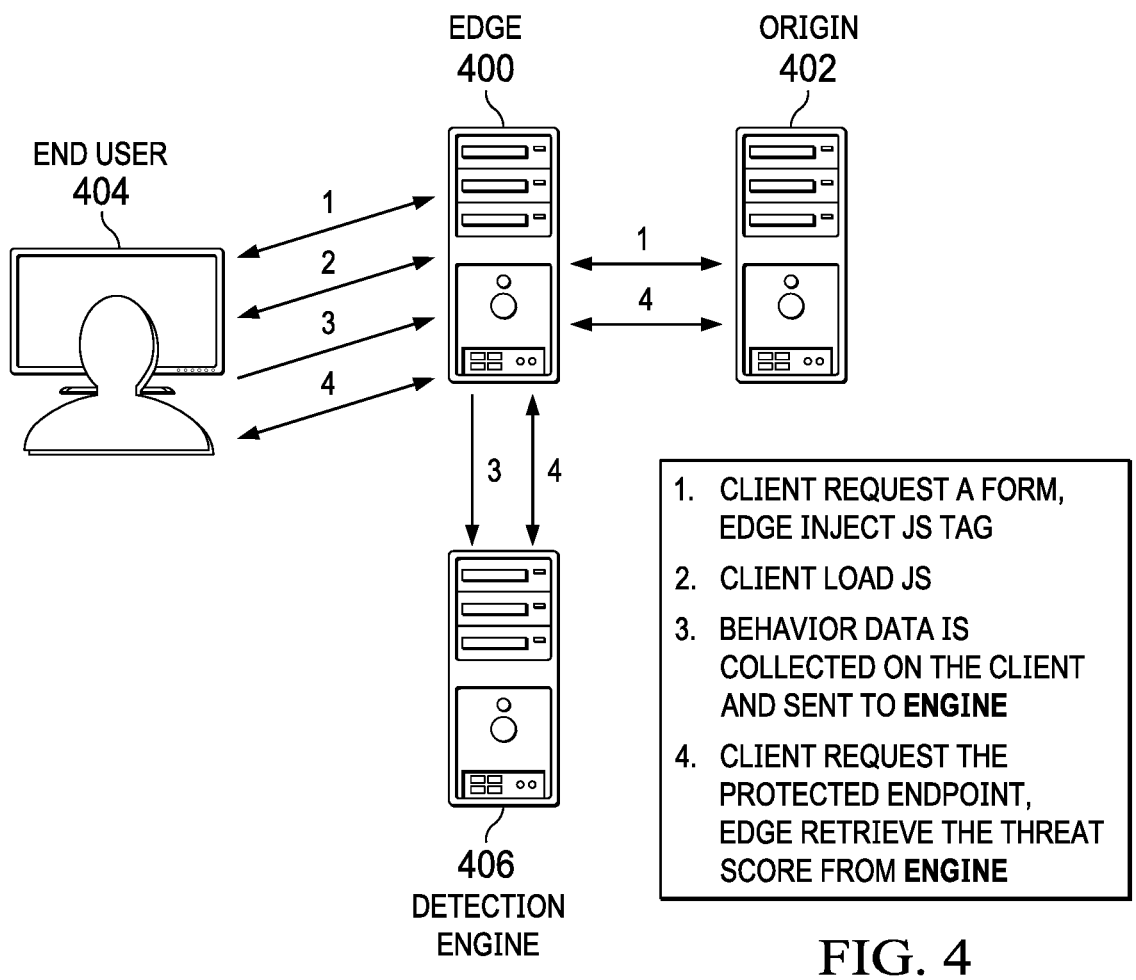
FIG. 4 depicts a representative bot detection method that leverages a CDN edge server and a detection engine according to this disclosure.
FIG. 5 represents a sample table for the primitive feature device size.

Bot detection using information collected through JavaScript (JS) may proceed as follows, and as depicted in FIG. 4. At step (1), the JS is dynamically injected at the edge server 400 on the relevant pages (text/html) that the edge retrieves from the origin server 402. At step (2), the client 404 loads the JS, executes it, and then sends the data collected (e.g., a JS fingerprint) back to the edge server, typically asynchronously. At step (3), the edge server 400 intercepts and evaluates the JS fingerprint, looking for specific anomalies typically seen when coming from an automated system (script or bot, etc.). At step (4), each anomaly is given a score and, if the fingerprint total anomaly (threat) score goes beyond a certain threshold, the client is classified as a bot. Preferably, the result of the fingerprint evaluation is recorded in a session cookie and evaluated with each subsequent request.

Thus, and as depicted in FIG. 4, JavaScript-based technology collects a lightweight fingerprint and perhaps other behavioral data from the client. Typically, the data is collected asynchronously and sent to a bot detection engine 406. On a protected request (e.g. a TLS-secured HTTP POST login), the edge server 400 obtains the client classification from the bot detection engine 406 and applies it on the edge.

Several methods may be used to detect bots using the fingerprint including, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

All of the above techniques can be modulated with other signals to produce higher accuracy.

Summarizing, the browser validation process collects information from the client using JavaScript techniques to help identify the type of client machine the edge server is interacting with and the configuration of the browser. This technique is often times referred as "fingerprinting." The process does not collect any information that could identify the user of the machine. The data collected (i.e., fingerprint) preferably is sent to a data collection platform and kept for a given time period. Preferably, the fingerprint is used to enable the provider to research and define new heuristics that help the bot detection engine to detect more advanced bots. These heuristics are preferably instantiated as detection rules and become part of a fingerprint evaluation ruleset. Preferably, the fingerprint process is only executed once a session. By analyzing the fingerprint and combining multiple parameters of the fingerprints together, it is possible to uniquely identify the client and to identify which site protected with the browser validation technology a given client visited. As additional related fingerprint information is collected and analyzed, the fingerprint evaluation ruleset may evolve, allowing the system to detect more bots. Preferably, clients that are identified as bots are tracked through their session cookie. The session cookie is unique to a given web site and cannot be used to correlate the activity of a given bot on other web sites, although the system may provide for the ability to track the activity of a botnet across customers that use the bot detection service. Activity coming from these bots preferably is tracked and reported. Logs of this activity are then to generate bot activity and bot analysis reports that can be reviewed by a customer through a secure portal.

Without intending to be limiting, the following provides additional details about a representative data collection process. Preferably, the JS injection technique collects client characteristics by querying DOM window objects, and also collects client characteristics by detecting browser automation. To enhance security, preferably the JS code is obfuscated, and there may be several versions of the obfuscated object to make the code appear to be different each time. The version of the JS served is recorded in the cookie to validate that a client follows a predefined workflow. Data collected by the JS is sent to the server as a URL-encoded form POST. The edge server extracts the relevant parameters and evaluates the values in-line to detect the bot. If a bot is detected, the session is flagged, and the full fingerprint is forwarded to other systems for further evaluation, typically off-line. Preferably, the JS executes a challenge that is self-contained in a single object. The code may be minified. Preferably, when injecting the JS, the transformed object is not cached at the edge. Cache busting headers may be sent to the client to prevent the transformed object to be cached by the browser or an intermediate proxy, and to further prevent false positives. The JS challenge object may be cached at the edge for a given time period.

In one operation, a client makes a request for a HTML page on a site protected with the bot detection service. In this example scenario, assume that primary bot detection rules did not trigger but that the client supports cookies. When receiving the request, the edge server validates a bot detection session cookie and fetches the content from the origin if not found in cache. If the user-agent indicates that the client supports JavaScript, the edge server injects the JavaScript code to the HTML page. To this end, a JavaScript is injected at the end of the document header, and the URL referencing the script may be in the following format "////$version_number/$challenge_ID ", where $version_number is a decimal value and $challenge_ID is computed as a function of a FILE_ID. The edge server randomly selects a number that represents the challenge file ID (FILE_ID). It also randomly selects a global variable (VAR) that is used to obfuscate the file ID. The edge computes the challenge_ID. Before serving the response, the edge server preferably updates the bot detection session cookie to indicate the browser validation process was initiated. The client receives the response and updates its cookie store. It parses the HTML code, and requests the different embedded objects (images, CSS, JS fonts). One of these objects is the JavaScript challenge. Basic bots that are configured to only request specific types of content or do not JavaScript will not request the embedded objects. When receiving the request for the JS challenge, the edge server validate the bot detection session cookie and fetches the challenge object from a data store when not found in cache. The response from the data store may include a unique identifier (UUID) that helps identify the challenge when receiving the fingerprint, and it helps prevent replay attacks. Before serving the response, the edge server updates the bot detection session cookie with the UUID. If the client supports JavaScript, it executes the script, collects all relevant parameters (fingerprint). The fingerprint is sent to the edge as a POST request, preferably on a "fingerprint callback" URL. The challenge ID set during the injection phase is reflected in the callback URL.

When receiving the fingerprint, the edge server validates the bot detection session cookie and performs the following: (a) validates the challenge ID, (b) authenticates, the fingerprint by validating the UUID, (c) extracts the relevant parameters for in-line bot detection, (d) evaluates the different parameters against the ruleset, (e) if the fingerprint data was received and passed the validation, the server updates the evaluation state in the session cookie to "Complete" when serving the response, (f) if the fingerprint data was not received, the server updates the evaluation state in the session cookie to "Incomplete" when serving the response, (g) if some anomalies were found in the fingerprint and revealed an automated system, the state is set to "bot" to flag the client so that the appropriate action is taken in the subsequent requests; and (h) once the response has been sent to the client, the edge passes to a learning system the fingerprint, the client ID computed at the edge, the header signature, and all other relevant information deemed useful.

The client updates its cookie store. After a while, the client sends a request for another page view. At this point the client will have gone through the validation process and the session cookie should be present in the request. The edge server validates the cookie, and checks the state of the validation process. If the client has successfully passed the fingerprinting process, it allows the request. If the client has completed the fingerprinting but was flagged as a bot, the edge takes the action associated with a bot detection rule. If the client did not complete the fingerprinting process, the edge server takes the action associated with an evaluation rule.

Preferably, the challenge served has a configurable TTL that preferably is limited in time. This timer defines how long the challenge is valid for and how long the client has to complete the validation process. This timer is designed to help reduce the following risks: detect bots that never request the JS or send a fingerprint, and replay attacks on the fingerprint. Preferably, the mechanism includes a retry process to give the client a second chance to complete the validation process and prevent false positive in the following scenarios: when the user navigates away from the page before the fingerprint process completed, the site automatically redirects or reloads a different page, e.g., based on some geolocation, and the JS process is initiated within an Iframe.

As has been described, it is known to provide a JavaScript-based technology to fingerprint clients and collect telemetry to evaluate the user behavior and differentiate bots from humans. Among other uses, this technology is useful to protect transactional workflows including, without limitation, login, checkout, search, gift card validation, coupons/rebates processing, etc., and that are regularly the target of fraud activity using botnets. The technology may also be used to protect web sites against scraping activities.

Generalized anomaly detection using primitive and compound feature sets

With the above as background, the following section describes an automated system for bot/fraud detection using "feature set" and associated frequency analysis. To this end, and as will be described, the approach herein mines CDN-wide end user transaction data to build so-called "primitive" and "compound" feature set data sets that are then used in a rule-based system to facilitate bot and fraud detection for new transactions. In this approach, preferably compound features are built by concatenating "primitives," such as canvas fingerprint, browser parameters, device size, user agent, TLS fingerprint, and possibly others (such as request headers).

As described above, websites routinely see significant automated malicious bot activity or human fraud committed against them. Although the solution herein is described in the context of bot detection, the approach also applies to mitigating human fraud. As also described, to combat these bots, various techniques and tools have arisen. One of the tools used to address this problem is device fingerprinting, e.g., running JavaScript on the client device and collecting various parameters as described above. These include user agent, client device sizes, browser parameters, fonts, plugins, canvas fingerprint, audio fingerprint, etc. As previously described, the combination of these parameters becomes a unique-enough fingerprint to isolate a client device from a bot. For example, consider the case of an operator of a bot who has one (1) million IP addresses. The malicious operator writes a script which runs across a million IP addresses. The website owner sees distributed traffic, and normal defense techniques (such as IP rate limiting) are rendered ineffective due to the distributed nature of the traffic. By using device fingerprinting, the same fingerprint will show up across all the one million devices. As a result, and using bot detection schemes as described above, the malicious script can now be blocked (either by a manual rule, or by an automated defense program that simply counts the number of transactions against a fingerprint and blocks after a limit). While such techniques work well for their intended purpose, as discussed above the bot operator can adapt once it determines that device fingerprinting is being used against the bot. To this end, the operator then modifies the attack script. Every time the script is launched, it randomly changes some of the device fingerprint parameters, for instance, randomizing user agent, device sizes, fonts, canvas fingerprint, etc. A bot detection system running on or in association with the website must itself then adapt if it is going to be successful in identifying the botnet (as the requests appear to be coming from multiple/distinct client computers). The technique herein addresses this need.

In particular, although certain device parameters (e.g. fonts, plugins, etc.) are fairly variable, other device fingerprinting parameters have strong functional correlation. Consider for example user agent and device sizes on an Apple® iPhone®. The user agent includes an iPhone specific string. Thus, for example, the device sizes returned by a script running on a legitimate iPhone 8 device typically either are (414×736) or (375×667), with the difference being plus model or regular model, respectively. Now, consider an attacker who is randomizing device fingerprinting parameters to try to defeat a device fingerprint detection scheme. As part of the randomization, if the attacker picks the iPhone user agent but the device sizes the script picks do not belong to the two (2) legal sizes above, then the combination of user agent and device size in the transaction can be detected as malicious The technique herein takes advantage of this type of learning to facilitate an advanced, generalized form of anomaly detection that is now described.

In general, the approach herein involves building a robust and fundamental understanding of a large set of rules in the device world, use that data to train a model, and then flag devices/transactions that do not meet or otherwise conform to those rules. For example, a sample rule (using the above example) might be that iPhone user agent can only have two (2) associated device sizes. Another rule could be that user agent X has associated size Y, canvas fingerprint Z, and so on. Preferably, and according to another aspect, a rule is created with respect to device parameters that have (or that can be shown to have) strong correlation. Thus, for example and as noted above, some of the device fingerprints, such as plugins, may be truly random and, therefore, should not be part of a rule. In addition, some of the device fingerprint parameters may be un-intuitively constrained and thus need to be examined by the system to determine whether they can or should be used in a rule. An example is a canvas fingerprint (referring to the HTML5 canvas element). The layman understanding is that this value is random, but on closer examination it can be seen that the value is tied to the combination of device, operating system and browser; as such, it may be a candidate to be used to support a rule.

The number of rules of course may be constrained and thus potentially difficult to manage. This is a function of both the number of devices, their frequent updates or releases, and the fact that manual creation of the rules is not necessarily a scalable approach. Indeed, rules may also change (or need to be changed) on frequent basis, such as when a manufacturer releases a new device with a different size.

Thus, a preferred solution is to implement the approach herein in a fully automated manner. A first step involves defining a set of primitive features. Representative primitive features include: (1) canvas fingerprint, (2) browser parameters, (3) device size, (4) user agent, (5) TLS fingerprint, (6) request headers, and possibly others. Preferably, each such feature is encoded as a string. Thus, e.g., a primitive feature for device size may be the string "1920×1080." Optionally, the string may be hashed. Using the primitive features, preferably one or more "compound" features are then defined. Compound features preferably are generated by applying a given function (e.g., concatenation) to the primitive features. For instance, a compound feature is feature (3)+(4) (namely, device size and user agent). Another compound feature could be the entire concatenation [(1)+(2)+(3)+(4)+(5)]. In general, there can be a total $2^{\wedge}N-1$ features (all possible combinations of N primitive features excepting an "empty string" feature). In the above case involving the five primitive features, this would be 31 compound features.

Functions other than (or in combination with) concatenation may be used to generate the compound feature set.

After defining the primitive and compound features, the next step in the process involving building so-called "ground truth" tables for these features (preferably both primitive and compound). Preferably, these tables are generated from data collected as end users interact with CDN edge servers in the usual manner (i.e., by having those end users directed to CDN edge servers via the CDN authoritative DNS). When end users interact with the CDN edge servers, the CDN data collection system (e.g., 108 in FIG. 1) collects large numbers (e.g., millions) of transactions. A transaction, for example, is a log line generated in an edge server that records information received from the requesting end user device. While an edge server typically does not track personally identifiable information (PII), in appropriate circumstances it may record information such as may be provided by a client-side script (in the manner previously described) running through large numbers of transactions received.

Typically, and in a representative embodiment, a ground truth table is a data structure that has multiple rows, where each row represents a primitive or compound feature value followed by a percentage occurrence of the feature across all transactions received. As used herein, the reference to "all transactions" may also be time-limited, geo-limited, network-limited, edge server region-limited, or some combination. Or, "all transactions" may mean all (or some given subset of the) transactions recorded by the CDN edge servers. As more transaction data is received, the model of a primitive or compound feature (namely, its relative percentages across the transaction set) becomes more refined (at least while the device in question has those feature(s)).

The above-described data structures comprise a database that is built, preferably through an automated training process and that is accessible by a detection engine such as depicted in FIG. 4.

FIG. 5 represents a sample table for the primitive feature device size.

FIG. 6 represents a sample table for the primitive feature canvas fingerprint.

FIG. 7 represents a sample table for the feature user agent;

FIG. 8 represents a sample table for a compound feature (canvas fingerprint | device size)

Preferably, the tables are built in an automated fashion by looking at all (or some given subset of the) relevant incoming transactions (collected from the edge server machines), and the percentages are then calculated based on the overall occurrence frequency (or some other configurable metric). Preferably, these tables are rebuilt periodically (e.g., at a configurable interval) or upon a given occurrence, thus allowing for rapidly incorporating new devices that emerge as well retiring stale devices. Collectively, these tables comprise a "model" that can then be used for bot and fraud detection in real-time.

Thus, for an incoming transaction, one or more features (primitive and compound) and their values are extracted, and then table lookups are performed. Preferably, two (2) checks are performed: (a) existence, namely, whether the feature exists, and if so: (b) frequency matching, what is the feature's relative frequency given the information in the identified table. Table lookups can be accelerated using known techniques, such as hashing.

Consider several use cases:

In a first example, the incoming transaction has a device size of 1925×1077. When a lookup is done on the primitive device size table, this device size does not exist in the table; thus, the transaction is marked malicious.

In a second example, the incoming transaction has a device size of 1920×1080 and an iPhone user agent. The primitive lookups on user agent and device size both show up as valid primitive features. The compound entry (user agent +device size), however, does not show up in the corresponding compound table; thus, once again the transaction is also marked malicious. The first and second examples illustrate the "existence" test may be performed both on the primitive feature value, and on a compound feature (or its value).

A third example involve a botnet operator that uses parameters from a good device (all primitive features and combinations). In this case, all of the existence lookups result in valid entries. If, however, the operator launches an attack, say, with a million transactions on a specific website, the resulting frequency of this fixed valid combination will vastly exceed the frequency in the table, and thus the transactions are marked as malicious. This third example illustrates how the frequency data in the relevant table is or can be used as an additional check. In this last example, some legitimate traffic having the same combination may be marked as false positives, but this can be alleviated by looking at other bot detection signals.

Thus, according to this disclosure, the approach mines CDN-wide end user transaction data to build "primitive" and "compound" feature set data sets (namely, their existence and frequency of occurrence) that are then used in a rule-based system to facilitate bot and fraud detection for new transactions. The particular primitives (or primitive combinations to produce compound features sets) may vary.

Other enabling technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

There is no limitation on the elements of the feature (and thus the compound) primitive set, and the method described herein is not limited to any particular feature or combination of features. Indeed, the framework described herein is flexible and designed such that new features (or more generally elements) can be readily included in a primitive (and thus compound) feature set. The number of features, or their ordering, is merely exemplary and should be taken to limit the technique. The number of features may vary (both

What we claim follows below:

1. A method of bot detection in a content delivery network (CDN) comprising a distributed set of edge servers, comprising:
   as clients interact with the edge servers, collecting transaction data;
   mining transaction data against a set of primitive or compound features sets to generate a database, the database comprising one or more data structures, wherein a given data structure associates a feature value with its relative percentage occurrence across the collected transaction data;
   upon receipt of a new transaction request, comparing primitive or compound feature set data derived from the new transaction request against the database; and
   based on the comparison, characterizing an end user client associated with the new transaction request;
   wherein the end user client is characterized as a bot (i) when the primitive or compound feature set derived from the new transaction request is not found in the database, or (ii) when the primitive or compound feature derived from the new transaction request is found in the database but a frequency of occurrence associated with additional transactions associated with the end user client is inconsistent with the relative percentages set forth in the database.

2. The method as described in claim 1 wherein the primitive features set comprises one of: a canvas fingerprint, one or more browser parameters, device size, user agent, TLS fingerprint, request headers, and one or more additional features, and combinations thereof.

3. The method as described in claim 2 wherein a compound feature set is a concatenation of two or more primitive feature sets.

4. The method as described in claim 1 wherein the transaction data is mined periodically.

5. The method as described in claim 1 further including taking a mitigation action with respect to the new transaction request upon a determination that the end user client is a bot.

6. The method as described in claim 1 wherein the transaction data is collected across all of the edge servers.

7. The method as described in claim 1 wherein the transaction data is collected across a subset of the edge servers.

8. The method as described in claim 1 further including providing a script for execution on the end user client, wherein the feature set data is collected upon execution of the script.

9. The method as described in claim 1 wherein a compound features set is defined for a pair of primitive feature sets that are shown to be correlated with one another.

10. The method as described in claim 1 wherein the method is carried out in an automated manner.

11. Apparatus, comprising: a processor; computer memory holding computer program instructions configured to:
   receive a request from a client;
   compare primitive or compound feature set data derived from the request against a database, the database comprising a database of one or more data structures, wherein a given data structure in the database associates a feature value with its relative percentage occurrence across a set of transaction data collected from prior transactions;
   based on the comparison, determine whether the client is a bot, wherein the client is characterized as a bot (i) when the primitive or compound feature set derived from the request is not found in the database, or (ii) when the primitive or compound feature derived from the request is found in the database but a frequency of occurrence associated with additional transactions associated with the client is inconsistent with the relative percentages set forth in the database; and
   upon a determination that the client is a bot, take a mitigation action with respect to the request.

12. The apparatus as described in claim 11 wherein the computer program instructions comprise a content delivery network edge server process.

13. The apparatus as described in claim 11 wherein the primitive feature set comprises one of: a canvas fingerprint, one or more browser parameters, device size, user agent, TLS fingerprint, request headers, and one or more additional features, and combinations thereof.

14. The apparatus as described in claim 11 wherein the compound feature set is a concatenation of two or more primitive feature sets.

15. The apparatus as described in claim 11 wherein the transaction data is mined periodically.

16. An article, comprising program media holding machine-readable code executable by a processor, the machine-readable code comprising code configured to:
   collect transaction data;
   mine transaction data against a set of primitive or compound features sets to generate a database, the database comprising one or more data structures, wherein a given data structure associates a feature value with its relative percentage occurrence across the collected transaction data;
   upon receipt of a new transaction request, compare primitive or compound feature set data derived from the new transaction request against the database; and
   based on the comparison, characterize an end user client associated with the new transaction request;
   wherein the end user client is characterized as a bot (i) when the primitive or compound feature set derived from the new transaction request is not found in the database, or (ii) when the primitive or compound feature derived from the new transaction request is found in the database but a frequency of occurrence associated with additional transactions associated with the end user client is inconsistent with the relative percentages set forth in the database.

17. The article as described in claim 16 wherein the primitive feature set comprises one of: a canvas fingerprint, one or more browser parameters, device size, user agent, TLS fingerprint, request headers, and one or more additional features, and combinations thereof.

18. The article as described in claim 16 wherein the compound feature set is a concatenation of two or more primitive feature sets.

19. The article as described in claim 16 wherein the code is further configured to take a mitigation action with respect to the new transaction request upon a determination that the end user client is a bot.

* * * * *